Dec. 4, 1956 W. C. LUDI ET AL 2,772,783
SKIMMING DEVICE
Filed July 9, 1954
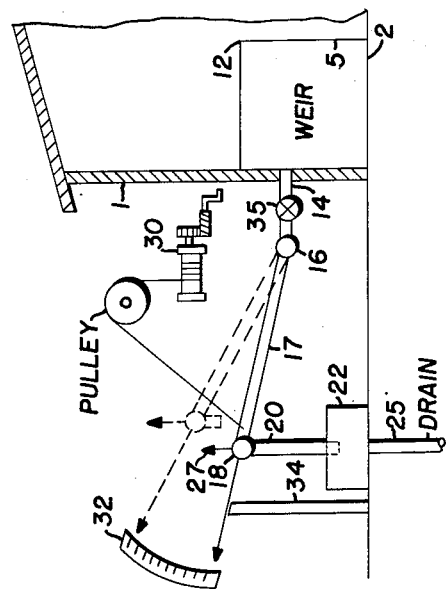
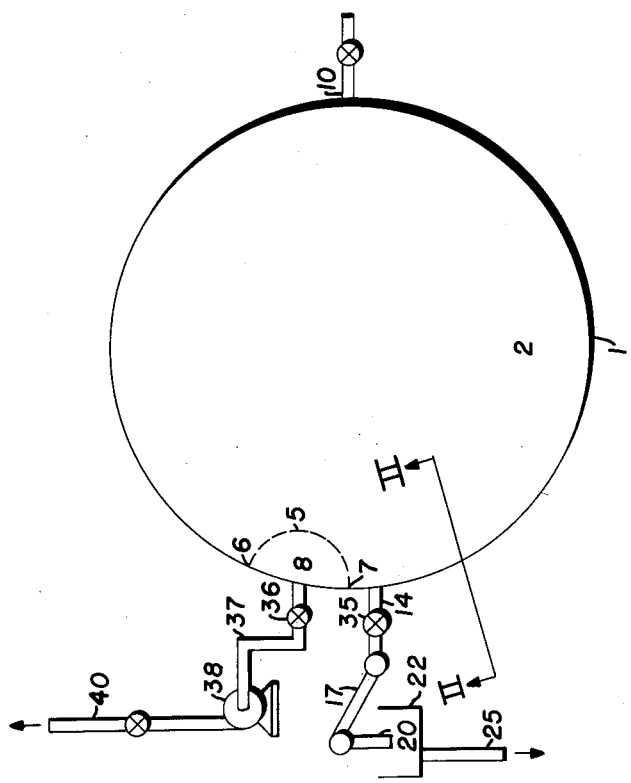
William C. Ludi
Christopher E. Loeser   Inventors
By [signature] Attorney

United States Patent Office 2,772,783
Patented Dec. 4, 1956

2,772,783
SKIMMING DEVICE

William C. Ludi, Matawan, and Christopher E. Loeser, Scotch Plains, N. J., assignors to Esso Research and Engineering Company, a corporation of Delaware Application July 9, 1954, Serial No. 442,274

1 Claim. (Cl. 210—60)

The present invention relates to an apparatus for the separation of the lighter of two substantially immiscible liquids of different gravities from a dispersion thereof in the heavier liquid. In addition, the invention relates to separation apparatus which includes an improved means for decanting the lighter liquid after separation from the heavier liquid and the establishment of an interface between them. More specifically, the invention relates to an apparatus for separating oil from a dispersion thereof in water.

It is an object of the invention to provide such an apparatus, wherein a separator tank is provided with an internal weir and receiving compartment for the lighter liquid in a lower portion of the tank, including a conduit for withdrawing the lighter liquid therefrom, and a means disposed externally of the tank for automatically establishing the interface between the separated liquids at the level of said weir, which means is also a drawoff conduit for the heavier liquid. It is also an object of the invention to provide a separation and decantation apparatus wherein decantation of the lighter liquid is accomplished at a level in the separator tank substantially below the initial level of the interface established between the separated liquids.

The invention and its objects will be fully understood from the following description taken in connection with the accompanying drawings in which Figure 1 is a diagrammatic transverse sectional view through a water storage tank showing a weir for functioning as an oil skimmer and showing the drawoff lines which differentiate between skimming oil and skimming water.

Figure 2 is a transverse sectional view looking along line 2—2 of Figure 1.

Referring particularly to the drawings, reference numeral 1 designates a large settling tank such as a ballast water tank customarily used to receive water ballast from a ship. In the ballast water tank, oil is separated from the water which latter is then pumped back into the bay or other source of disposal. The tank 1 has a floor 2.

An oil skimmer is disposed in a localized portion of the tank. The oil skimmer is formed by a weir 5 which extends upwardly from the bottom wall of the tank and terminates at both ends 6 and 7 in engagement with the side walls of the tank to form a relatively small auxiliary compartment 8 opening upwardly within the tank 1. In the preferred embodiment of the invention the oil skimmer has a radius of 4 feet in relation to a ballast water tank of dimensions of 80 feet in diameter by 36 feet high. A 14-inch inlet line 10 is provided for ballast water brought to the tank 1 from the wharf. The upper edge 12 of the weir 5 constitutes a spillway for removal of the oil when the water level is in its lowermost position. The spillway can be disposed at a level of about 2 feet 6 inches from the bottom wall 2 of the tank 1.

Means are provided for drawing water from the tank 1. This means includes a drawoff line 14 which leads from the tank 1 exteriorly of the compartment 8 and below the level of the upper edge 12 of the weir 5. In the embodiment illustrated, the drawoff pipe 14 has a diameter of 6 inches and leads from the tank 1 about 1 foot above the bottom wall 2. The drawoff line 14 carries a swing joint 16 which connects it to a swing pipe 17. Swing pipe 17 is connected through a swing joint 18 to a discharge section 20 extending therefrom and opening into a trough 22. The trough 22 discharges water delivered thereto through drawoff line 14, swing pipe 17 and discharge section 20 and discharges it through a drain 25 to a place of disposal such as a storm water sewer not shown. In the embodiment illustrated, swing pipe 17 and discharge section 20 are 6 inches in diameter and the drain 25 is 14 inches in diameter.

A purpose of the swing pipe 17 is to control the level at which the water is lowered in the tank 1. The lowest level of the water in the tank 1 will be no lower than the elevation of the outer end of the swing pipe 17. A vacuum breaker 27 is carried by the swing joint 18 to prevent siphoning of the water through the swing pipe 17 and auxiliary section 20 into trough 22. An elevating and clamping device 30 and a scale 32 are provided so that the swing arm 17 can be set at the required elevation above the upper edge 12 of the weir 5. The scale is calibrated to inches above the weir. A pointer is attached to the end of the swing arm to aid in setting the elevation. A stop 34 is provided so that the outer end of the swing arm 17 cannot be lowered below the weir height.

In operation, if a 2-inch layer of oil is on the surface of the water, the outer end of the swing pipe 17 will be set at an elevation of 2 inches above the upper edge 12 of the weir 5. The thickness of the oil layer can be determined by the use of thieving paste on a gaging tape or the like. Having determined the thickness of the oil layer, the swing pipe is set with the outer end above the level of the weir equivalent to the thickness of the oil layer after which the water valve 35 in the drawoff line 14 is opened and permitted to drain off the water from within the tank 1 until the flow of water stops at the level of the upper edge 12 of the weir 5. The water remaining in the tank is trapped behind the weir 5.

The water oil interface being at the weir height, there remains the layer of oil above the weir. Oil valve 36 in oil drawoff line 37 is opened and the oil starts to flow over the spillway constituted by the upper edge 12 of the weir into the auxiliary compartment 8 and then escapes through drawoff line 37 to a skimmed oil pump 38 and is discharged through line 40 to any suitable place of disposal such as a crude oil unloading line not shown. The oil drawoff pipe 37 opens from behind the weir 5 and draws off the small amount of water trapped by the weir within compartment 8 as well as the layer of oil which in the embodiment illustrated amounts to a layer of 2 inches in thickness.

By the construction described, all of the apparatus for skimming oil from water in the tank 1 is disposed exteriorly of the tank. The only operations which require manual handling are to gage the tank to determine the thickness of the layer of oil and to set the water drawoff swing pipe for this thickness. The oil drawoff valve 36 is opened at some convenient time after the water stops flowing out of the water drawoff swing pipe 17. Otherwise, the operation is automatic. The water escape pipe is left open and when the water stops flowing the layer of oil is drawn off. Preferably the water discharge line is sized for a certain length of time to empty the tank 1 of water. The only moving parts are disposed exteriorly of the tank. The operation of the skimmer is simple to adjust and maintain.

While the invention has been described to an apparatus for skimming oil from water, it is understood that it is applicable also for separating non-soluble liquids of differ-

We claim:

An apparatus for separating and separately withdrawing oil from a mixture of oil and water, comprising a receiving vessel for a batch of said mixture, wherein the oil and water are separated from said batch by gravity to form a superposed layer of the oil on the water, a weir plate having parallel and opposite longitudinal upper and lower edge portions, and end edge portions, said plate being secured along its lower edge portion to the floor of said vessel, and extending upwardly therefrom to a height at its upper edge portion which is a minor portion of the height of said vessel, said weir plate being secured at each end edge portion to a wall of said vessel and therewith defining a compartment, opening upwardly into said vessel, of which the volume is a minor portion of the total volume of said vessel, an outlet conduit for oil communicating with said compartment interiorly thereof below the upper edge of said weir, an outlet for water communicating with said vessel below the upper edge of said weir and exteriorly of said compartment, said water outlet having an outer end and a valve therein, a swing joint conduit connection at the outer end of said water outlet communicating therewith and movable in a vertical plane with reference thereto, said swing joint connection including a discharge end and vacuum breaker means adjacent said end, a stop support for said swing joint conduit connection disposed exteriorly of said vessel to engage said swing joint conduit and support said discharge end thereof at a depressed level thereof substantially in a plane common to the upper edge of said weir, and means for elevating said swing joint conduit discharge end to, and for retaining said end at a level above said weir substantially equal to the thickness of a layer of oil separated from and superposed on a layer of water in said vessel.

References Cited in the file of this patent

UNITED STATES PATENTS

| | | |
|---|---|---|
| 911,314 | Maranville | Feb. 2, 1909 |
| 1,272,850 | Robbins | July 16, 1918 |
| 1,675,755 | Umbarger | July 3, 1928 |
| 1,694,471 | Jacobi | Dec. 11, 1928 |
| 1,723,197 | Montgomery | Aug. 6, 1929 |
| 2,447,425 | Norton et al. | Aug. 17, 1948 |
| 2,468,069 | Hunter | Apr. 26, 1949 |
| 2,493,166 | Schmitz | Jan. 3, 1950 |